US011823358B2

United States Patent
He et al.

(10) Patent No.: US 11,823,358 B2
(45) Date of Patent: Nov. 21, 2023

(54) HANDWRITTEN CONTENT REMOVING METHOD AND DEVICE AND STORAGE MEDIUM

(71) Applicant: Hangzhou Dana Technology Inc., Zhejiang (CN)

(72) Inventors: Tao He, Zhejiang (CN); Huan Luo, Zhejiang (CN); Mingquan Chen, Zhejiang (CN)

(73) Assignee: Hangzhou Dana Technology Inc., Zhejiang (CN)

( * ) Notice: Subject to any disclaimer, the term of this patent is extended or adjusted under 35 U.S.C. 154(b) by 0 days.

(21) Appl. No.: 17/791,220

(22) PCT Filed: Dec. 29, 2020

(86) PCT No.: PCT/CN2020/141110
§ 371 (c)(1),
(2) Date: Jul. 7, 2022

(87) PCT Pub. No.: WO2021/147631
PCT Pub. Date: Jul. 29, 2021

(65) Prior Publication Data
US 2023/0037272 A1 Feb. 2, 2023

(30) Foreign Application Priority Data
Jan. 21, 2020 (CN) .......................... 202010072431.4

(51) Int. Cl.
*G06T 5/00* (2006.01)
*G06V 30/244* (2022.01)
(Continued)

(52) U.S. Cl.
CPC .............. *G06T 5/005* (2013.01); *G06V 30/15* (2022.01); *G06V 30/162* (2022.01);
(Continued)

(58) Field of Classification Search
CPC .......... G06T 5/005; G06T 2207/30176; G06V 30/2455; G06V 30/1801; G06V 30/42; G06V 30/162; G06V 30/15; G09B 3/02
See application file for complete search history.

(56) References Cited

U.S. PATENT DOCUMENTS

| | | | | |
|---|---|---|---|---|
| 6,043,823 | A * | 3/2000 | Kodaira | G06T 7/11 345/619 |
| 7,391,917 | B2 * | 6/2008 | Ohta | G06F 16/56 382/253 |

(Continued)

FOREIGN PATENT DOCUMENTS

| | | |
|---|---|---|
| CN | 101482968 | 7/2009 |
| CN | 104281625 | 1/2015 |

(Continued)

OTHER PUBLICATIONS

"International Search Report (Form PCT/ISA/210) of PCT/CN2020/141110," dated Mar. 26, 2021, with English translation thereof, pp. 1-6.

(Continued)

*Primary Examiner* — Gregory M Desire
(74) *Attorney, Agent, or Firm* — JCIPRNET

(57) ABSTRACT

A handwritten content removing method and device and a storage medium. The handwritten content removing method comprises: acquiring an input image of a text page to be processed, the input image comprising a handwritten region, which comprises a handwritten content (S10); identifying the input image so as to determine the handwritten content in the handwritten region (S11); and removing the handwritten content in the input image so as to obtain an output image (S12).

13 Claims, 5 Drawing Sheets

(51) Int. Cl.
*G06V 30/18* (2022.01)
*G06V 30/42* (2022.01)
*G06V 30/162* (2022.01)
*G06V 30/148* (2022.01)
*G09B 3/02* (2006.01)

(52) U.S. Cl.
CPC ...... *G06V 30/1801* (2022.01); *G06V 30/2455* (2022.01); *G06V 30/42* (2022.01); *G06T 2207/30176* (2013.01); *G09B 3/02* (2013.01)

(56) References Cited

U.S. PATENT DOCUMENTS

| | | | | |
|---|---|---|---|---|
| 7,657,091 | B2* | 2/2010 | Postnikov | G06Q 20/042 |
| | | | | 382/137 |
| 9,582,230 | B1* | 2/2017 | Sankaran | H04N 1/56 |
| 9,740,925 | B2* | 8/2017 | Haji | G06V 30/2276 |
| 10,606,933 | B2* | 3/2020 | Breuel | G06F 40/131 |
| 10,679,091 | B2* | 6/2020 | Flament | G06V 30/224 |
| 10,936,897 | B2* | 3/2021 | Vig | G06V 30/413 |
| 2008/0144131 | A1 | 6/2008 | Jung et al. | |

FOREIGN PATENT DOCUMENTS

| | | |
|---|---|---|
| CN | 108921158 | 11/2018 |
| CN | 109254711 | 1/2019 |
| CN | 111275139 | 6/2020 |
| CN | 111488881 | 8/2020 |
| EP | 1231558 | 8/2002 |

OTHER PUBLICATIONS

"Written Opinion of the International Searching Authority (Form PCT/ISA/237) of PCT/ CN2020/141110," dated Mar. 26, 2021, pp. 1-5.

* cited by examiner

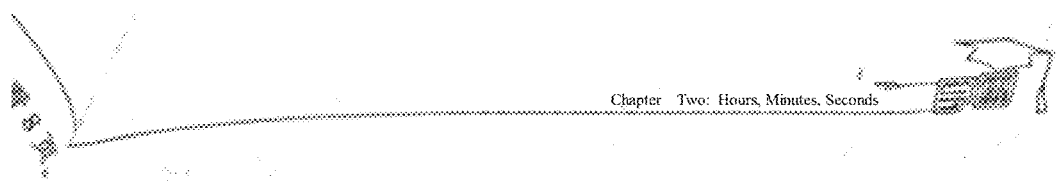

Chapter Two: Hours, Minutes, Seconds

 Understanding hours and minutes

Level 1
Speed Practice | Everyone can do it, I can do it fast

1. Look at the clock face and write the time.

 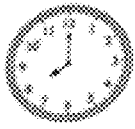

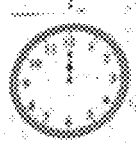 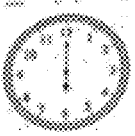

2. Draw the hour and minute hands on the clock face.

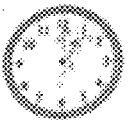 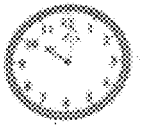

1:00    10:00

3. Fill in the appropriate time unit in ( ).

We spend about 6 (　) a day in school.

It takes 20 (　) to eat lunch

It takes about 10 (　) to do a set of radio exercises.

It takes about 1 (　) and 30 (　) to watch a movie.

4. Fill in ">", ">" or "=" in ◯

4 hours ◯ 4 minutes    1 hour ◯ 60 minutes 2 hours ◯ 100 minutes    30 minutes ◯ 3 hours 100 minutes ◯ 1 hour    90 minutes ◯ half hour 5. (1) The time for the hour hand to move 1 circle is (　) hour(s), and the time for the minute hand to move 1 circle is (　) minute(s).

(2) The hour hand moves from 12 to 3, taking (　) hour(s), and the minute hand moves from 12 to 3, taking (　) minute(s).

(3) The hour hand moves from 6 to 8, then the minute hand has to moves (　) circle(s).

(4) At (　) o'clock, the hour and minute hands overlap, and at (　) o'clock, the hour and minute hands form a straight line.

(5) Xiao Ming arrives at school at 8:00 a.m. and leaves school at 11:00 a.m. During this time, the hour hand moves for (　) hour(s).

Level 2
Accuracy Practice | Everyone do it, I can doing it right 6. (1) Xiao Ming spent 30 minutes doing his homework when he got home from school, spent a quarter of an hour watching <100,000 Whys>, and then helped his mother mop the floor, and exactly 1 hour had passed, so Xiao Ming spent (　) minute(s) mopping the floor.

(2) Within the time when the hour hand moves 1 large grid, the minute hand moves (　) circle(s), so within the time when the hour hand moves 1 circle, the minute hand moves (　) circle(s).

(3) It takes 5 minutes for one person to sing a song, so it takes (　) minute(s) for 9 people to sing the song at the same time.

FIG. 2B

HANDWRITTEN CONTENT REMOVING METHOD AND DEVICE AND STORAGE MEDIUM

CROSS-REFERENCE TO RELATED APPLICATION

This application is a 371 of international application of PCT application serial no. PCT/CN2020/141110, filed on Dec. 29, 2020, which claims the priority benefit of China application no. 202010072431.4, filed on Jan. 21, 2020. The entirety of each of the above mentioned patent applications is hereby incorporated by reference herein and made a part of this specification.

BACKGROUND

Technical Field

The embodiments of the disclosure relate to a handwritten content removing method, a handwritten content removing device, and a storage medium.

Description of Related Art

At present, it is not uncommon for a student to forget to bring his/her homework home or lose his/her workbooks. If this happens, parents or the student may turn to his/her classmate for the homework content. However, sometimes the classmate may have already finished the relevant homework content, so the photo of the homework taken by the classmate may include the answer content written by the classmate, and it is therefore inconvenient for the student to write the same homework. Besides, when the user uses a mobile phone to capture a homework photo, shadow is often produced in the homework photo due to the different lighting in the picture-capturing environment. If the homework photo is then printed directly, the printer may directly print the shadow part in the homework photo, ink is thereby wasted and reading is affected.

SUMMARY

At least one embodiment of the disclosure provides a handwritten content removing method. The method includes the following steps. An input image of a text page to be processed is acquired. The input image includes a handwritten region, and the handwritten region includes handwritten content. The input image is identified to determine the handwritten content in the handwritten region. The handwritten content in the input image is removed to obtain an output image.

For instance, in the handwritten content removing method provided by an embodiment of the disclosure, the input image further includes a text printed region, and the text printed region includes printed content. The step of identifying the input image to determine the handwritten content in the handwritten region includes the following step. A region identification model is used to identify the input image to obtain the text printed region and the handwritten region.

For instance, in the handwritten content removing method provided by an embodiment of the disclosure, the step of removing the handwritten content in the input image to obtain the output image includes the following steps. The handwritten region is labeled to obtain a handwritten region labeling frame. The handwritten region labeling frame includes the handwritten region. The handwritten region labeling frame is cut and removed from the input image to obtain the output image.

For instance, in the handwritten content removing method provided by an embodiment of the disclosure, the step of cutting and removing the handwritten region labeling frame from the input image to obtain the output image includes the following steps. The handwritten region labeling frame is cut and removed from the input image to obtain an intermediate output image. A binarization process is performed on the intermediate output image to obtain the output image.

For instance, in the handwritten content removing method provided by an embodiment of the disclosure, the input image further includes a text printed region, and the text printed region includes printed content. The step of identifying the input image to determine the handwritten content in the handwritten region includes the following step. A region identification model is used to identify the input image to obtain the text printed region and the handwritten region, and a pixel identification model is used to perform pixel identification on the handwritten region to determine handwritten content pixels corresponding to the handwritten content in the handwritten region.

For instance, in the handwritten content removing method provided by an embodiment of the disclosure, the step of removing the handwritten content in the input image to obtain the output image includes the following steps. A replacement pixel value is acquired. Pixel values of the handwritten content pixels are replaced with the replacement pixel value, so as to remove the handwritten content from the input image to obtain the output image.

For instance, in the handwritten content removing method provided by an embodiment of the disclosure, the step of replacing the pixel values of the handwritten content pixels with the replacement pixel value so as to remove the handwritten content from the input image to obtain the output image includes the following steps. The pixel values of the handwritten content pixels are replaced with the replacement pixel value, so as to remove the handwritten content from the input image to obtain an intermediate output image. A binarization process is performed on the intermediate output image to obtain the output image.

For instance, in the handwritten content removing method provided by an embodiment of the disclosure, the replacement pixel value is the pixel value of any pixel in the handwritten region except for the handwritten content pixels. Alternatively, the replacement pixel value is an average value of pixel values of all pixels in the handwritten region except for the handwritten content pixels.

For instance, in the handwritten content removing method provided by an embodiment of the disclosure, the text page to be processed is an exam paper or a worksheet, the printed content includes a question stem, and the handwritten content includes an answer.

For instance, in the handwritten content removing method provided by an embodiment of the disclosure, the handwritten content includes handwritten characters.

For instance, in the handwritten content removing method provided by an embodiment of the disclosure, the step of acquiring the input image of the text page to be processed includes the following steps. An original image of the text page to be processed is acquired. The original image includes a text region to be processed. Edge detection is performed on the original image to determine the text region to be processed in the original image. A correction process is performed on the text region to be processed to obtain the input image.

At least one embodiment of the disclosure provides a handwritten content removing device including a memory configured for non-transitory storage of a computer-readable instruction and a processor configured for executing the computer-readable instruction. The computer-readable instruction executes the handwritten content removing method according to any one of the above embodiments when being executed by the processor.

For instance, the handwritten content removing device provided by an embodiment of the disclosure further includes an image acquisition component. The image acquisition component is configured for acquiring a homework image. The memory is configured for storing the homework image, and the processor is further configured for reading and processing the homework image to obtain the input image.

At least one embodiment of the disclosure provides a storage medium configured for non-transitory storage of a computer-readable instruction. The handwritten content removing method according to any one of the above embodiments can be performed when the computer-readable instruction is executed by a computer.

BRIEF DESCRIPTION OF THE DRAWINGS

In order to explain the technical solutions of the embodiments of the disclosure more clearly, the accompanying drawings of the embodiments will be briefly introduced below. Obviously, the accompanying drawings in the following description only relate to some embodiments of the disclosure, rather than limit the disclosure.

FIG. 2B is a schematic picture of an output image according to at least one embodiment of the disclosure.

DESCRIPTION OF THE EMBODIMENTS

To better illustrate the goal, technical solutions, and advantages of the disclosure, the accompanying drawings in the embodiments of the disclosure are included to provide a clear and complete description of the technical solutions provided in the embodiments of the disclosure. Obviously, the described embodiments are merely part of the embodiments, rather than all of the embodiments, of the disclosure. Based on the embodiments describing the disclosure, all other embodiments obtained by a person having ordinary skill in the art without making any inventive effort fall within the scope that the disclosure seeks to protect.

Unless otherwise defined, the technical terms or scientific terms used in the disclosure shall have the usual meanings understood by a person having ordinary skill in the art. The "first", "second", and similar words used in the disclosure do not indicate any order, quantity or importance, but are only used to distinguish different components. "Include" or "comprise" and other similar words mean that the element or item appearing before the word covers the elements or items listed after the word and their equivalents, but does not exclude other elements or items. "Connection" or "conjunction" and other similar words are not limited to physical or mechanical connections, but may include electrical connections, whether direct or indirect. "Up", "down", "left", "right", etc. are only used to indicate relative positional relationships. When the absolute position of the described object changes, the relative position relationship may also change accordingly.

In order to keep the following description of the embodiments of the disclosure clear and concise, detailed description of some known functions and known components is omitted in the disclosure.

At least one embodiment of the disclosure provides a handwritten content removing method, a handwritten content removing device, and a storage medium. The handwritten content removing method includes the following steps. An input image of a text page to be processed is acquired. Herein, the input image includes a handwritten region, and the handwritten region includes handwritten content. The input image is identified to determine the handwritten content in the handwritten region. The handwritten content in the input image is removed to obtain an output image.

Through the handwritten content removing method, the handwritten content in the handwritten region in the input image may be effectively removed to facilitate outputting a new page for filling. Besides, through the handwritten content removing method, the input image may also be converted into a form that is convenient for printing, so that a user can print the input image as a paper form for filling.

The embodiments of the disclosure will be described in detail below with reference to the accompanying drawings, but the disclosure is not limited to these specific embodiments.

Figure 1:
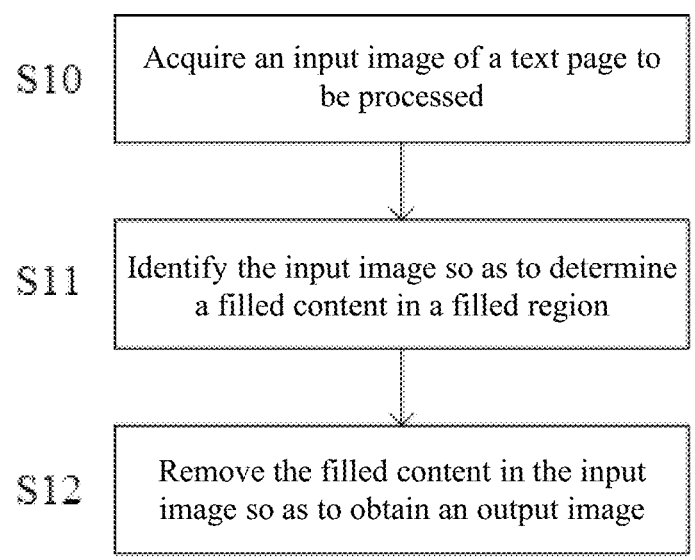
FIG. 1 is schematic flow chart of a handwritten content removing method according to at least one embodiment of the disclosure.
Figure 2A:
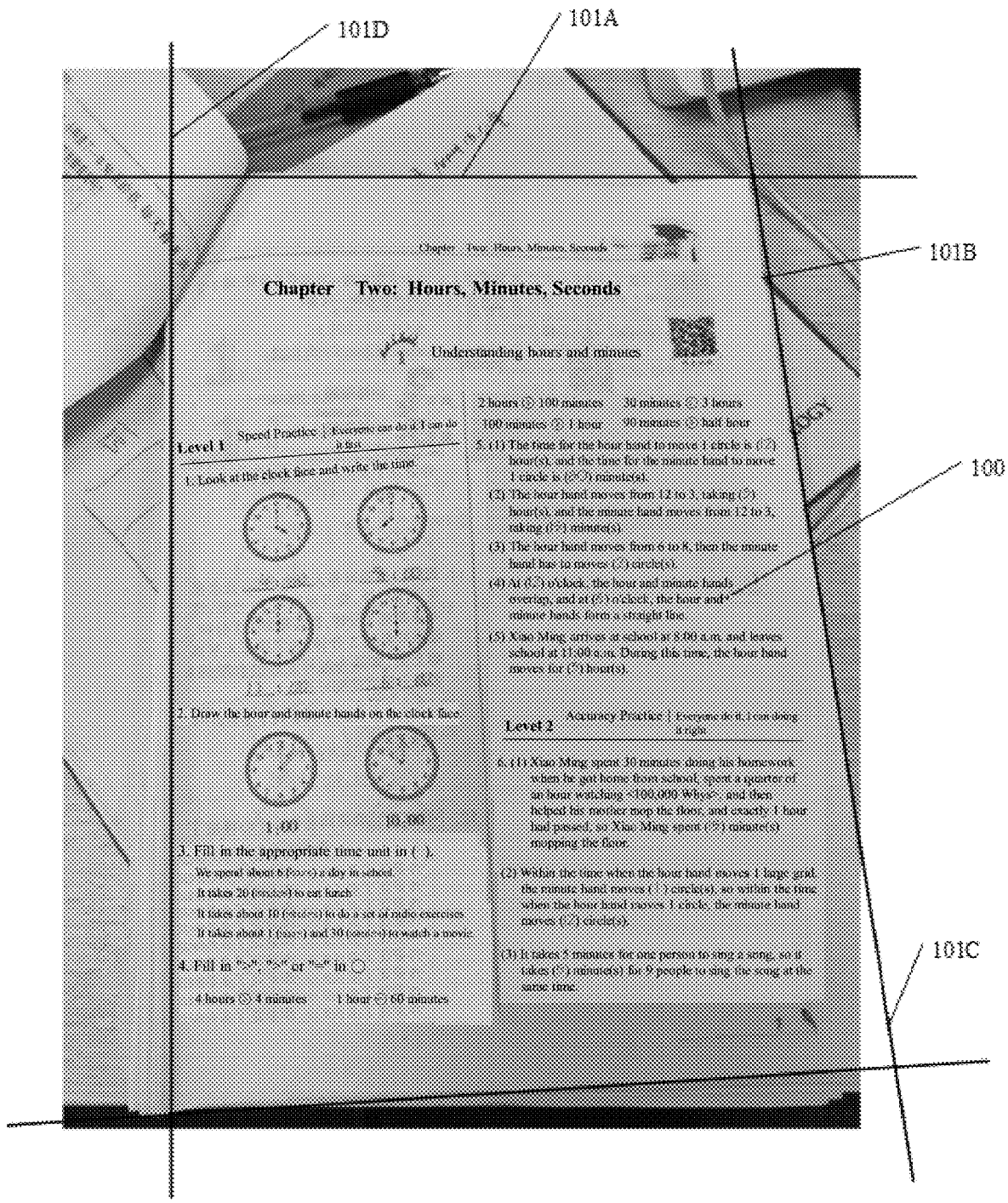
FIG. 2A is a schematic picture of an original image according to at least one embodiment of the disclosure.

FIG. 1 is schematic flow chart of a handwritten content removing method according to at least one embodiment of the disclosure. FIG. 2A is a schematic picture of an original image according to at least one embodiment of the disclosure. FIG. 2B is a schematic picture of an output image according to at least one embodiment of the disclosure.

For instance, as shown in FIG. 1, the handwritten content removing method provided by the embodiments of the disclosure includes steps S10 to S12.

As shown in FIG. 1, first, in step S10 provided by the handwritten content removing method, an input image of a text page to be processed is obtained.

For instance, in step S10, the input image includes a handwritten region, and the handwritten region includes handwritten content. The input image may be any image that includes the handwritten content.

For instance, the input image may be an image captured by an image capturing device (e.g., a digital camera or a mobile phone, etc.), and the input image may be a grayscale image or a color image. Note that the input image refers to a form in which the text page to be processed is presented in a visual manner, such as a picture of the text page to be processed.

For instance, the handwritten region does not have a fixed shape, but depends on the handwritten content. That is, a region with handwritten content is the handwritten region, and the handwritten region may have a regular shape (e.g., a rectangle, etc.) or an irregular shape. The handwritten region may include a filled region, handwritten drafts, or other handwritten marked regions, and the like.

For instance, the input image further includes a text printed region, and the text printed region includes printed content. The shape of the text printed region may also be a regular shape (e.g., a rectangle, etc.) or an irregular shape. In the embodiments of the disclosure, the shape of each handwritten region is a rectangle and the shape of each text printed region is a rectangle as an example for description, but the disclosure is not limited thereto.

For instance, the text page to be processed may include an exam paper, a worksheet, a form, a contract, and the like. The exam paper may be an exam paper of various subjects, for example, Chinese, mathematics, foreign languages (e.g., English, etc.), and similarly, the worksheet may also be an exercise set of various subjects and the like. The form may be of various types, such as a year-end summary form, an onboarding form, a price summary, an application form, and so on, and the contract may include a labor contract and the like. The types of the text page to be processed are not specifically limited in the disclosure.

For instance, the text page to be processed may be text in a paper form or text in an electronic form. For instance, when the text page to be processed is an exam paper or a worksheet, the printed content may include a question stem, and the handwritten content may include an answer filled in by the user (e.g., a student or teacher, etc.) (in this case, the answer is an answer filled in by the user, not a correct answer or a standard answer), calculation drafts, or other handwritten marks, etc. The printed content may further include various symbols, graphics, and the like. When the text page to be processed is an onboarding form, the printed content may include "name", "gender", "ethnicity", "work history" and the like, and the handwritten content may include handwritten information such as the user's name, gender (male or female), ethnicity, and work experience that the user (e.g., employee, etc.) fills in the onboarding form.

For instance, the shape of the text page to be processed may be a rectangle or the like, and the shape of the input image may be a regular shape (e.g., a parallelogram, a rectangle, etc.) to facilitate printing. However, the disclosure is not limited thereto, and in some embodiments, the input image may also be irregularly shaped.

For instance, since the image may be deformed when the image capturing device captures the image, the size of the input image and the size of the text page to be processed are different, but the disclosure is not limited thereto. The size of the input image and the size of the text page to be processed may also be the same.

For instance, the text page to be processed includes the printed content and the handwritten content. The printed content may be the content obtained by printing, the handwritten content may be the content handwritten by the user, and the handwritten content may include handwritten characters.

Note that the "printed content" not only refers to content such as words, characters, graphics, etc., which are inputted on an electronic device through an input device. In some embodiments, when the text page to be processed is an exam paper or a worksheet, the question stem may also be handwritten by the user. In this case, the printed content is a printed question stem handwritten by the user.

For instance, the printed content may include text in various languages, such as Chinese (e.g., Chinese characters or pinyin), English, Japanese, French, Korean, and the like. Besides, the printed content may also include numbers, various symbols (e.g., the greater-than sign, less-than sign, plus sign, multiplication sign, etc.), various graphics, and the like. The handwritten content may also include characters, numbers, symbols, and graphics in various languages.

For instance, in the schematic picture shown in FIG. 2A, a text page to be processed 100 is a worksheet, and the region surrounded by four boundary lines (straight lines 101A to 101D) represents a text region to be processed 100 corresponding to the text page to be processed. In the text region to be processed 100, a printed region includes a question stem region, and printed content may include various question stems, for example, "1. Look at the clock face and write the time", "2. Draw the hour and minute hands on the clock face", "It takes about 1 ( ) 30 ( ) to watch a movie", etc. The printed content may also include various clock graphics, two-dimensional code graphics, etc. in the text region to be processed 100. The handwritten region includes a handwritten answer region, and the handwritten content may include an answer filled in by the user with a pencil. For instance, in the text "We spend about 6 (hours) a day in school", the character "hour" in parentheses is the handwritten content, and in the text "It takes 5 minutes for one person to sing a song, so it takes (5) minutes for 9 people to sing the song at the same time", the number "5" in parentheses is the handwritten content.

For instance, the input image may include a plurality of pieces of handwritten content and a plurality of pieces of printed content. The plurality of pieces of handwritten content are spaced from each other, and the plurality of pieces of printed content are also spaced from each other. For instance, some pieces among the plurality of pieces of handwritten content may be the same (i.e., the characters of the handwritten content are the same, but the specific shapes of the handwritten content are different), and some pieces among the plurality of pieces of printed contents may also be the same. The disclosure is not limited thereto, the plurality of pieces of handwritten content may be different from one another, and the plurality of pieces of printed content may also be different from one another. As shown in FIG. 2A, "speed practice" and "accuracy practice" are two pieces of printed content spaced apart from each other, "minutes" in the text "It takes 20 (minutes) to eat lunch" and "minutes" in "It takes about 10 (minutes) to do a set of radio exercises" are two pieces of handwritten content spaced apart from each other, and the two pieces of handwritten content are the same.

For instance, in some embodiments, step S10 may include the following steps. An original image of the text page to be processed is acquired. Herein, the original image includes a text region to be processed. Edge detection is performed on the original image to determine the text region to be processed in the original image. A correction process is performed on the text region to be processed to obtain the input image.

For instance, a neural network or an edge detection algorithm based on OpenCV may be used to perform edge detection on the original image to determine the text region to be processed. For instance, OpenCV is an open source computer vision library, and the edge detection algorithms based on OpenCV include Sobel, Scarry, Canny, Laplacian, Prewitt, Marr-Hildresh, scharr, and many other algorithms.

The step of performing edge detection on the original image to determine the text region to be processed in the original image may include the following steps. The original image is processed to obtain a line drawing of the grayscale contours in the original image, where the line drawing includes a plurality of lines. The similar lines in the line drawing are merged to obtain a plurality of initial merged lines, and a boundary matrix is determined according to the plurality of initially merged lines. A target line is obtained by merging similar lines in the plurality of initial merged lines, and the initial merged line that are not merged are treated as target lines as well, and a plurality of target lines are thereby obtained. According to the boundary matrix, a plurality of reference boundary lines are determined from among the plurality of target lines. The original image is processed through a pre-trained boundary line region identification model to obtain a plurality of boundary line regions of the text page to be processed in the original image. For each boundary line region, a target boundary line corresponding to the boundary line region is determined from among the plurality of reference boundary lines. According to the determined plural target boundary lines, the edge of the text region to be processed in the original image is determined.

For instance, in some embodiments, the step of processing the original image to obtain the line drawing of the grayscale contours in the original image includes the following step. The original image may be processed through an edge detection algorithm based on OpenCV to obtain the line drawing of grayscale contours in the original image.

For instance, the step of merging similar lines in the line drawing to obtain the plurality of initial merged lines includes the following steps. Long lines in the line drawing are acquired, where the long lines are lines whose length exceeds a first predetermined threshold. A plurality of groups of first-type lines are acquired from the long lines, where the first-type lines include at least two sequentially adjacent long lines, and the included angle between any two adjacent long lines is less than a second predetermined threshold. For each group of first-type lines, each long line in the group of first-type lines is sequentially merged to obtain an initial merged line.

For instance, the line matrix is determined as follows. The initial merged lines and the lines among the long lines that are not merged are redrawn, and the position information of the pixel points in all the redrawn lines is mapped to the matrix of the entire original image. The values at the positions of the pixel points of these lines in the matrix of the original image are set as a first numerical value, and the values at the positions of the pixel points outside these lines are set as a second numerical value, and a boundary matrix is thereby formed.

For instance, the step of merging similar lines in the plurality of initial merged lines to obtain a target line includes the following steps. A plurality of groups of second-type lines are acquired from the initial merged lines, where the second-type lines include at least two sequentially adjacent initial merged lines, and the included angle between any two adjacent initial merged lines is less than a third predetermined threshold. For each group of second-type lines, each initial merged line in the group of second-type lines is sequentially merged to obtain a target line.

For instance, the first predetermined threshold may be a length of 2 pixels, and the second predetermined threshold and the third predetermined threshold may be 15 degrees. It should be noted that the first predetermined threshold, the second predetermined threshold, and the third predetermined threshold may be set according to actual application needs.

For instance, the step of determining the plurality of reference boundary lines from the plurality of target lines according to the boundary matrix includes the following steps. For each target line, the target line is extended, a line matrix is determined according to the extended target line, and then the line matrix is compared with the boundary matrix. The number of pixel points belonging to the boundary matrix on the extended target line is calculated as the score of the target line, that is, the line matrix is compared with the boundary matrix to determine how many pixel points fall into the boundary matrix. That is, it is determined how many pixel points in the same position in the two matrices have the same first value, for example, 255, so as to calculate the score, where the size of the line matrix and the boundary matrix are the same. According to the score of each target line, the plurality of reference boundary lines are determined from the plurality of target lines. Note that the number of target lines with the best scores may be multiple. Therefore, according to the scores of each target line, a plurality of target lines with the best scores are determined from among the plurality of target lines as reference boundary lines.

For instance, the line matrix is determined as follows. The extended target line or straight line is redrawn, and the position information of the pixel points in the redrawn line is mapped to the matrix of the entire original image. The value at the position of the pixel point of the line in the matrix of the original image is set as the first numerical value, the value at the position of the pixel point outside the line is set as the second numerical value, and a line matrix is thereby formed.

For instance, the step of determining the target boundary line corresponding to the boundary line region from among the plurality of reference boundary lines for each boundary line region includes the following steps. The slope of each reference boundary line is calculated. For each boundary line region, the Hough transform is used to convert the boundary line region into a plurality of straight lines, and the average slope of the plurality of straight lines is calculated. It is then determined whether there is a reference boundary line whose slope matches the average slope among the plurality of reference boundary lines, and if so, the reference boundary line is determined as the target boundary line corresponding to the boundary line region. If it is determined that there is no reference boundary line whose slope matches the average slope among the plurality of reference boundary lines, for each straight line converted from the boundary line region, the line matrix formed by the line is compared with the boundary matrix. The number of pixel points belonging to the boundary matrix on the line is calculated as the score of the line. The straight line with the best score is determined as the target boundary line corresponding to the boundary line region, where the line matrix is the same size as the boundary matrix. Note that if there are multiple straight lines with the best score, the first straight line among these straight lines is treated as the best boundary line according to the sorting algorithm.

For instance, the boundary line region identification model is a neural network-based model. The boundary line region identification model may be established through machine learning training.

For instance, after performing edge detection on the original image, multiple target boundary lines (e.g., four target boundary lines) may be determined, and the text region to be processed is determined by the multiple target boundary lines. For instance, the text region to be processed may be determined according to a plurality of intersection points of the multiple target boundary lines and multiple target boundary lines. Every two adjacent target boundary lines intersect to obtain an intersection point, and the multiple intersection points and the multiple target boundary lines jointly define the region where the text to be processed in the original image is located. For instance, in the example shown in FIG. 2A, the text region to be processed may be a worksheet region surrounded by four target boundary lines. The four target boundary lines are all straight lines, and the four target boundary lines are respectively a first target boundary line 101A, a second target boundary line 101B, a third target boundary line 101C, and a fourth target boundary line 101D. In addition to the text region to be processed, the original image may also include a non-text region, for example, a region other than the region enclosed by the four boundary lines in FIG. 2A.

For instance, in some embodiments, the step of performing a correction process on the text region to be processed to obtain the input image includes the following step. Perspective transformation is performed on the text region to be processed to obtain a front view of the text region to be processed, and the front view is the input image. Perspective transformation is a technique for projecting an image onto a new viewing plane, also known as projective mapping. Because in the original image obtained by photo taking, the real shape of the text to be processed is changed in the original image, that is, geometric distortion is generated. As shown in the original image in FIG. 2A, the shape of the text to be processed (that is, the worksheet) is originally a rectangle, but the shape of the text to be processed in the original image is changed, becoming an irregular polygon. Therefore, by performing perspective transformation on the text region to be processed in the original image, the text region to be processed may be transformed from an irregular polygon into a rectangle or a parallelogram. That is, the text region to be processed is corrected to remove the influence of geometric distortion, and the front view of the text to be processed in the original image is obtained. Perspective transformation may process the pixels in the text region to be processed according to the spatial projection converted coordinates to obtain the front view of the text to be processed, and description thereof is not repeated herein.

Note that in some other embodiments, the text region to be processed may also be directly cut from the original image without performing the correction process to obtain a separate image of the text region to be processed, and the separate image of the text region to be processed is the input image.

For instance, the original image may be an image directly captured by the image capturing device, or an image obtained after preprocessing the image directly captured by the image capturing device. The original image may be a grayscale image or a color image. For instance, in order to prevent the removal of the handwritten content from being affected by data quality and data imbalance of the original image, before the original image is inputted, the original image may be pre-processed in the handwritten content removing method provided by the embodiments of the disclosure. Preprocessing may eliminate irrelevant information or noise information in the original image, so as to better process the original image. The preprocessing may include, for example, scaling, cropping, Gamma correction, image enhancement, or noise reduction filtering on the image directly captured by the image capturing device.

Note that in some embodiments, the original image may be treated as the input image, and in this case, for example, the original image may be directly identified to determine the handwritten content in the original image. The handwritten content in the original image is then removed to obtain the output image. Alternatively, the original image may be directly identified to determine the handwritten content in the original image, and the handwritten content in the original image is then removed to obtain an intermediate output image. Edge detection is performed on the intermediate output image to determine the text region to be processed in the intermediate output image. A correction process is performed on the text region to be processed to obtain the output image. That is, in some embodiments of the disclosure, the handwritten content in the original image may be removed first to obtain the intermediate output image, and then edge detection and correction processing are performed on the intermediate output image.

Next, as shown in FIG. 1, in step S11, the input image is identified to determine the handwritten content in the handwritten region.

For instance, in some embodiments, step S11 may include the following step. A region identification model is used to identify the input image to obtain the text printed region and the handwritten region. Note that in the disclosure, "determining the handwritten content" does not mean that specific characters in the handwritten content need to be determined, but the position of the handwritten content in the input image needs to be determined. For instance, in this embodiment, since the handwritten content is located in the handwritten region, "obtaining the handwritten region" means to determine the handwritten content in the handwritten region.

For instance, the region identification model represents a model that performs region identification (or division) on an input image. The region identification model may be implemented using machine learning technology (e.g., neural network technology) and run, for example, on a general-purpose computing device or a special-purpose computing device, and the region identification model is a pre-trained model. For instance, neural networks applied to the region identification model may include a deep convolutional neural network, a mask-region convolutional neural network (Mask-RCNN), a deep residual network, an attention model, and the like.

For instance, identifying a region (e.g., text printed region or handwritten region) of an input image using a region identification model includes identifying the boundaries of the region. For instance, in the case where a region is defined by a rectangle and two adjacent sides of the rectangle are respectively parallel to a horizontal line parallel to the horizontal direction and a vertical line parallel to the vertical direction, the region may be determined by determining at least three vertices of the rectangle. In the case where the region is defined by a parallelogram, the region may be determined by determining at least three vertices of the parallelogram. In the case where the region is defined by a quadrilateral (e.g., trapezoid and any irregular quadrilateral, etc.) and at least one boundary of the quadrilateral may also be inclined with respect to the horizontal or vertical line, the region may be determined by determining the four vertices of the quadrilateral.

Next, as shown in FIG. 1, in step S12, the handwritten content in the input image is removed to obtain an output image.

For instance, step S12 includes the following steps. The handwritten region is labeled to obtain a handwritten region labeling frame. The handwritten region labeling frame is cut and removed from the input image to obtain the output image.

For instance, the handwritten region labeling frame includes the handwritten region, that is, the handwritten region labeling frame covers the handwritten region.

For instance, the handwritten region may be labeled based on a neural network. In some embodiments, Mask-RCNN may be used to label the handwritten region to obtain the handwritten region labeling frame, and the processing flow of Mask-RCNN may include the following. An image to be processed (i.e., the input image) is inputted, and then the image to be processed is preprocessed, or the image to be processed is a preprocessed image. The image to be processed is then inputted into a pre-trained neural network to obtain a corresponding feature map. Next, a predetermined number of regions of interest (ROIs) are set for each point in the feature map, and a plurality of candidate ROIs are thereby obtained. Next, these candidate ROIs are sent to the region proposal network (RPN) for binary classification (foreground or background) and bounding-box regression, and the uninteresting regions are filtered out to obtain target ROIs. Next, the target ROIs are subjected to the ROIAlign operation (that is, the pixels of the image to be processed and the feature map are first mapped, and then the feature map is mapped to the fixed features). Finally, these target ROIs are classified and are subjected to bounding-box regression and masked region generation, so as to obtain the handwritten region labeling frame of the handwritten region. Performance of the bounding-box regression on the target ROIs may make the obtained handwritten region labeling frame closer to the actual position of the handwritten content. For instance, when Mask-RCNN is applied to identify the handwritten content, the masked region of the handwritten content may be directly acquired, and the masked region of the handwritten content is labeled with an external rectangular labeling frame. That is, the external labeling frame includes the masked region.

For instance, the handwritten region labeling frame is determined by the center coordinates of the handwritten region labeling frame and the length and height of the handwritten region labeling frame. Different handwritten content may have different shapes of handwritten region labeling frames.

For instance, the step of cutting and removing the handwritten region labeling frame from the input image to obtain the output image includes the following step. The handwritten region labeling frame is cut and removed from the input image to obtain the intermediate output image. A binarization process is performed on the intermediate output image to obtain the output image.

The binarization process is to set the grayscale values of the pixel points on the intermediate output image to 0 or 255, that is, the process of making the entire intermediate output image present an obvious black and white effect. The binarization process may greatly reduce the amount of data in the intermediate output image, so that the outline of the target may be highlighted. The binarization process may convert the intermediate output image into a grayscale image (i.e., the output image) with obvious black and white contrast, and the converted grayscale image has less noise interference, which can effectively improve the recognition degree and printing effect of the content in the output image.

For instance, after the handwritten region labeling frame is cut and removed from the input image, all pixels in the region corresponding to the handwritten region labeling frame are removed. That is, the pixels in the region corresponding to the handwritten region labeling frame in the input image are empty, that is, there are no pixels. When the intermediate output image is subjected to binarization processing, no processing is performed on the region where the pixels in the intermediate output image are empty. Alternatively, when the intermediate output image is subjected to binarization processing, the region in which the pixels in the intermediate output image are empty may be filled with a grayscale value of 255.

For instance, after the intermediate output image is subjected to binarization processing, an output image is finally obtained, which can facilitate the user to print the output image into a paper form. For instance, when the input image is a worksheet, the output image may be printed in a paper form for a student to answer.

For instance, the binarization method may be a threshold method, and the threshold method includes: setting a binarization threshold. The pixel value of each pixel in the intermediate output image is compared to a binarization threshold. If the pixel value of a pixel in the intermediate output image is greater than or equal to the binarization threshold, the pixel value of the pixel is set to 255 grayscale. If the pixel value of a specific pixel in the intermediate output image is less than the binarization threshold, the pixel value of the pixel is set to 0 grayscale. In this way, the binarization processing of the intermediate output image may be implemented.

For instance, the selection method of the binarization threshold includes the bimodal method, the P-parameter method, Otsu's method, the maximum entropy method, and the iterative method.

For instance, in some embodiments, performing a binarization process on the intermediate output image includes the following steps. The intermediate output image is obtained. Grayscale processing is performed on the intermediate output image to obtain a grayscale image of the intermediate output image. According to a first threshold, the grayscale image is binarized to obtain a binarized image of the intermediate output image. The binarized image is treated as a guide image, and the grayscale image is subjected to guide filter processing to obtain a filtered image. According to a second threshold, high-value pixel points in the filtered image are determined, and the grayscale values of the high-value pixel points are greater than the second threshold. According to a predetermined expansion coefficient, the grayscale values of the high-value pixel points are expanded to obtain an expanded image. The expanded image is clarified to obtain a clarified image, and the contrast of the clarified image is adjusted to obtain the output image.

For instance, grayscale processing methods include a component method, a maximum value method, an average value method, a weighted average method, and the like.

For instance, the predetermined expansion coefficient is 1.2 to 1.5, e.g., 1.3. The grayscale value of each high-value pixel point is multiplied by the predetermined expansion coefficient to perform expansion processing on the grayscale value of the high-value pixel point, so that an expanded image with a more obvious black and white contrast is obtained.

For instance, the second threshold is the sum of the grayscale mean value of the filtered image and the standard deviation of the grayscale value.

For instance, the step of clarifying the expanded image to obtain the clarified image includes the following steps. Gaussian filtering is used to blur the expanded image to obtain a blurred image. According to a predetermined mixing coefficient, the blurred image and the expanded image are mixed proportionally to obtain the clarified image.

For instance, it is assumed that $f_1(i, j)$ is the grayscale value of the pixel point at $(i, j)$ of the extended image, $f_2(i, j)$ is the grayscale value of the pixel point at $(i, j)$ of the blurred image, $f_3(i, j)$ is the grayscale value of the pixel point at $(i, j)$ of the clarified image, $k_1$ is the predetermined mixing coefficient of the expanded image, and $k_2$ is the predetermined expansion coefficient of the blurred image, then $f_1(i, j)$, $f_2(i, j)$, and $f_3(i, j)$ satisfy the following relationship:

$$f_3(i,j)=k_1 f_1(i,j)+k_2 f_2(i,j).$$

For instance, the predetermined mixing coefficient of the expanded image is 1.5, and the predetermined mixing coefficient of the blurred image is −0.5.

For instance, the step of adjusting the contrast of the clarified image includes the following step. According to the grayscale mean value of the clarified image, the grayscale value of each pixel point of the clarified image is adjusted.

For instance, the grayscale value of each pixel point of the clarified image may be adjusted by the following formula:

$$f_1'(i,j) = \bar{f} + (f(i,j) - \bar{f}) * (1+t),$$

where $f_1'(i, j)$ is the grayscale value of the pixel point at (i, j) of the enhanced image, $\bar{f}$ is the grayscale mean value of the clarified image, $f(i, j)$ is the grayscale value of the pixel point at (i, j) of the clarified image, and t is the intensity value. For instance, the intensity value may be 0.1 to 0.5, e.g., the intensity value may be 0.2. In practical applications, the intensity value may be selected according to the final black and white enhancement effect to be achieved.

For instance, in some other embodiments, step S11 may include the following steps. A region identification model is used to identify the input image to obtain the text printed region and the handwritten region. A pixel identification model is used to perform pixel identification on the handwritten region to determine handwritten content pixels corresponding to the handwritten content in the handwritten region. In this embodiment, since the handwritten content pixels may represent the position of the handwritten content, "determining the handwritten content pixels" means determining the handwritten content in the handwritten region.

For instance, the pixel identification model represents a model for pixel identification of the handwritten content in the handwritten region, and the pixel identification model may identify the handwritten content pixels corresponding to the handwritten content in the handwritten region. The pixel identification model may also achieve region identification based on a neural network. For example, the neural network applied to the pixel identification model may include a deep convolutional neural network and the like.

For instance, as shown in FIG. 1, step S12 may include the following steps. A replacement pixel value is acquired. Pixel values of the handwritten content pixels are replaced with the replacement pixel value, so as to remove the handwritten content from the input image to obtain the output image.

For instance, the replacement pixel value may be the pixel value of any pixel in the handwritten region except for the handwritten content pixels. Alternatively, the replacement pixel value may an average value (e.g., geometric average value) of pixel values of all pixels in the handwritten region except for the handwritten content pixels. Alternatively, the replacement pixel value may also be a fixed value, for example, a 255 grayscale value. Note that a pixel identification network may be used to directly extract any pixel in the handwritten region except the handwritten content pixels to obtain the replacement pixel value. Alternatively, a pixel identification network may be used to extract all the pixels in the handwritten region except for the handwritten content pixels, and then the replacement pixel value is obtained based on the pixel values of all the pixels.

For instance, the step of replacing the pixel values of the handwritten content pixels with the replacement pixel value so as to remove the handwritten content from the input image to obtain the output image may include the following steps. The pixel values of the handwritten content pixels are replaced with the replacement pixel value, so as to remove the handwritten content from the input image to obtain an intermediate output image. A binarization process is performed on the intermediate output image to obtain the output image.

It should be noted that, for the description of the region identification model performing region identification, binarization processing, etc., reference may be made to the abovementioned related description, and repeated description is not repeated herein.

For instance, after the handwritten content removal process is performed on the original image shown in FIG. 2A, the output image shown in FIG. 2B may be obtained, and the output image is a binarized image. As shown in FIG. 2B, in this output image, all handwritten content is removed, resulting in an unanswered worksheet.

Note that in the embodiments of the disclosure, a model (e.g., an arbitrary model such as a region identification model, a pixel identification model, etc.) is not a mere mathematical model, but a module that can receive input data, perform data processing, and output processing results. The module may be a software module, a hardware module (e.g., a hardware neural network) or a combination of software and hardware. In some embodiments, the region identification model and/or the pixel identification model includes codes and programs stored in the memory. The processor may execute the codes and programs to implement some or all of the functions of the region identification model and/or pixel identification model as described above. In some other embodiments, the region identification model and/or the pixel identification model may include a circuit board or a combination of circuit boards for implementing the functions described above. In some embodiments, the one circuit board or the combination of multiple circuit boards may include (1) one or a plurality of processors, (2) one or a plurality of non-transitory computer-readable memories connected to the processor, and (3) firmware executable by the processor and stored in the memory.

It should be understood that in the embodiments of the disclosure, before the input image is acquired, the handwritten content removing method further includes: a training phase. The training phase includes the process of training the region identification model and the pixel identification model. It should be noted that the region identification model and the pixel identification model may be trained separately, or the region identification model and the pixel identification model may be trained together.

For instance, the region identification model may be obtained by training the region identification model to be trained by using a first sample image labeled with the text printed region (for example, the number of the labeled text printed region is at least one) and the handwritten region (for example, the number of the labeled handwritten region is at least one). For instance, the training process of the region identification model to be trained may include the following. In the training phase, the region identification model to be trained is trained by using a plurality of first sample images labeled with the text printed region and the handwritten region to obtain the region identification model.

For instance, the step of using the plurality of first sample images to train the region identification model to be trained may include the following steps. A current first sample image is obtained from the plurality of first sample images. The current first sample image is processed by using the region identification model to be trained to obtain a training text printed region and a training handwritten region. According to the text printed region and handwritten region labeled in the current first sample image and the training text printed region and the training handwritten region, the first loss value of the region identification model to be trained is calculated by the first loss function. The parameters of the region identification model to be trained are modified according to the first loss value. When the first loss function satisfies the first predetermined condition, a trained region identification model is obtained, and when the first loss function does not satisfy the first predetermined condition, the first sample images are kept to be inputted to repeat the above training process.

For instance, in an example, the first predetermined condition corresponds to that the loss of the first loss function converges (i.e., the first loss value is no longer significantly reduced) when a certain number of first sample images are inputted. For instance, in another example, the first predetermined condition is that the number of training times or training periods reaches a predetermined number (for example, the predetermined number may be millions).

For instance, the pixel identification model may be obtained by training the pixel identification model to be trained by using a second sample image labeled with the handwritten content pixels. When the handwritten content pixels in the second sample image are labeled, the second sample image may be enlarged to accurately label all the handwritten content pixels. Machine learning is performed based on various handwritten features (e.g., pixel grayscale features, font features, etc.) to build the pixel identification model.

For instance, the training process of the pixel identification model to be trained may include: in the training phase, the pixel identification model to be trained is trained by using a plurality of second sample images labeled with the handwritten content pixels to obtain the pixel identification model.

For instance, the step of using the plurality of second sample images to train the region identification model to be trained may include the following steps. A current second sample image is obtained from the plurality of second sample images. The current second sample image is processed by using the pixel identification model to be trained to obtain trained handwritten content pixels. According to the handwritten content pixels labeled in the current second sample image and the trained handwritten content pixels, the second loss value of the pixel identification model to be trained is calculated by the second loss function. The parameters of the pixel identification model to be trained are modified according to the second loss value. When the second loss function satisfies the second predetermined condition, a trained pixel identification model is obtained, and when the second loss function does not satisfy the second predetermined condition, the second sample images are kept to be inputted to repeat the above training process.

For instance, in an example, the second predetermined condition corresponds to that the loss of the second loss function converges (i.e., the second loss value is no longer significantly reduced) when a certain number of second sample images are inputted. For instance, in another example, the second predetermined condition is that the number of training times or training periods reaches a predetermined number (for example, the predetermined number may be millions).

A person having ordinary skill in the art may understand that the multiple first training sample images and the multiple second training sample images may be the same or different.

Figure 3:
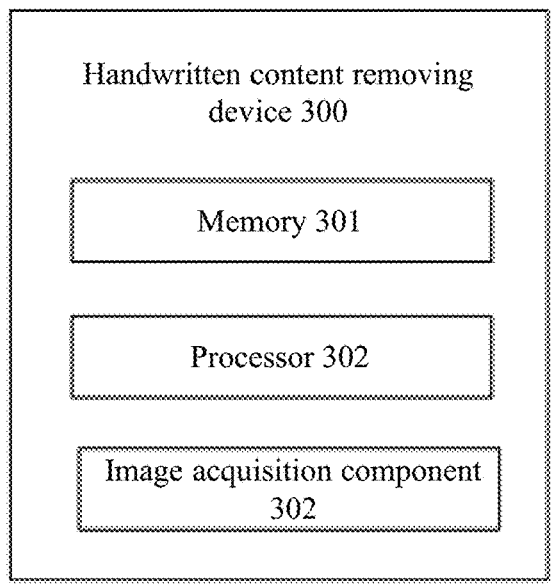
FIG. 3 is schematic block diagram of a handwritten content removing device according to at least one embodiment of the disclosure.

At least one embodiment of the disclosure further provides a handwritten content removing device, and FIG. 3 is schematic block diagram of a handwritten content removing device according to at least one embodiment of the disclosure.

As shown in FIG. 3, a handwritten content removing device 300 includes a processor 302 and a memory 301. Note that the components of the handwritten content removing device 300 shown in FIG. 3 are only exemplary and are not restrictive, and the handwritten content removing device 300 may also include other components according to actual application needs.

For instance, the memory 301 is used for non-transitory storage of computer-readable instructions. The processor 302 is configured to execute the computer-readable instructions, and when the computer-readable instructions are executed by the processor 302, the handwritten content removing method according to any of the foregoing embodiments is executed.

The handwritten content removing device 300 provided by the embodiments of the disclosure may be used to implement the handwritten content removing method provided by the embodiments of the disclosure, and the handwritten content removing device 300 may be configured on an electronic apparatus. The electronic apparatus may be a personal computer, a mobile terminal, etc., and the mobile terminal may be a hardware apparatus featuring various operating systems, such as a mobile phone, a tablet computer, and the like.

For instance, as shown in FIG. 3, the handwritten content removing device 300 may further include an image acquisition component 303. The image acquisition component 303 is configured to acquire a homework image, for example, a homework image of paper homework. The memory 301 may be further configured to store the homework image, and the processor 302 is further configured to read and process the homework image to obtain the input image. It should be noted that the homework image may be the original image described in the abovementioned embodiments of the handwritten content removing method.

For instance, the image acquisition component 303 is the image capturing device described in the embodiments of the handwritten content removing method. For instance, the image acquisition component 303 may be a camera of a smart phone, a camera of a tablet computer, a camera of a personal computer, a lens of a digital camera, or a webcam.

For instance, as shown in the embodiments of FIG. 3, the image acquisition component 3031, the memory 301, and the processor 302, etc. may be physically integrated in the same electronic apparatus, and the image acquisition component 303 may be a camera configured on the electronic apparatus. The memory 301 and the processor 302 receive images sent from the image acquisition component 303 via the internal bus. For another example, the image acquisition component 303 and the memory 301/processor 302 may be configured separately in physical locations. The memory 301 and the processor 302 may be integrated in the electronic apparatus of the first user (for example, the computer, mobile phone, etc. of the first user), and the image acquisition component 303 may be integrated in the electronic apparatus of the second user (the first user and the second user are different). The electronic apparatus of the first user and the electronic apparatus of the second user may be configured separately in physical locations, and communication between the electronic apparatus of the first user and the electronic apparatus of the second user may be performed in a wired or wireless manner. That is, after the original image is acquired by the image acquisition component 303 on the electronic apparatus of the second user, the electronic apparatus of the second user may send the original image to the electronic apparatus of the first user via a wired or wireless manner. The electronic apparatus of the first user receives the original image and performs subsequent processing on the original image. For instance, the memory 301 and the processor 302 may also be integrated in a cloud server, and the cloud server receives the original image and processes the original image.

For instance, the handwritten content removing device 300 may further include an output device for outputting the output image. For instance, the output device may include a display (e.g., an organic light emitting diode display and a liquid crystal display), a projector, and the like, and the display and the projector may be used to display the output image. It should be noted that the output device may further include a printer, and the printer is used to print the output image.

For instance, components such as the processor 302 and the memory 301 may communicate through network connection. The network may include a wireless network, a wired network, and/or any combination of wireless and wired networks. The network may include a local area network, the Internet, a telecommunication network, the Internet of Things based on the Internet and/or a telecommunication network, and/or any combination of the above networks, and the like. The wired network may, for example, use twisted pair, coaxial cable, or optical fiber transmission for communication, and the wireless network may adopt a communication method such as a 3G/4G/5G mobile communication network, Bluetooth, Zigbee, or WiFi. Herein, the types and functions of the network are not limited in the disclosure.

For instance, the processor 302 may control other components in the handwritten content removing device 300 to perform desired functions. The processor 302 may be a device with data processing capability and/or program execution capability, such as a central processing unit (CPU), a tensor processing unit (TPU), or a graphics processing unit (GPU). The CPU may be X86 or ARM architecture, etc. The GPU may be individually integrated directly onto the motherboard or built into the northbridge chip of the motherboard. The GPU may also be built into the CPU.

For instance, the memory 301 may include any combination of one or more computer program products, and the computer program product may include various forms of computer-readable storage media, such as a volatile memory and/or a non-volatile memory. The volatile memory may include random access memory (RAM) and/or cache memory (cache), for example. The non-volatile memory may include, for example, read only memory (ROM), hard disk, erasable programmable read only memory (EPROM), portable compact disk read only memory (CD-ROM), universal serial bus (USB) memory, flash memory, etc. One or more computer-readable instructions may be stored on the computer-readable storage medium, and the processor 302 may run the computer-readable instructions to implement various functions of the handwritten content removing device 300. Various application programs and various data may also be stored in the storage medium.

For a detailed description of the process of executing the handwritten content removing method by the handwritten content removing device 300, reference may be made to the relevant descriptions in the embodiments of the handwritten content removing method, and repeated description is not provided herein.

Figure 4:
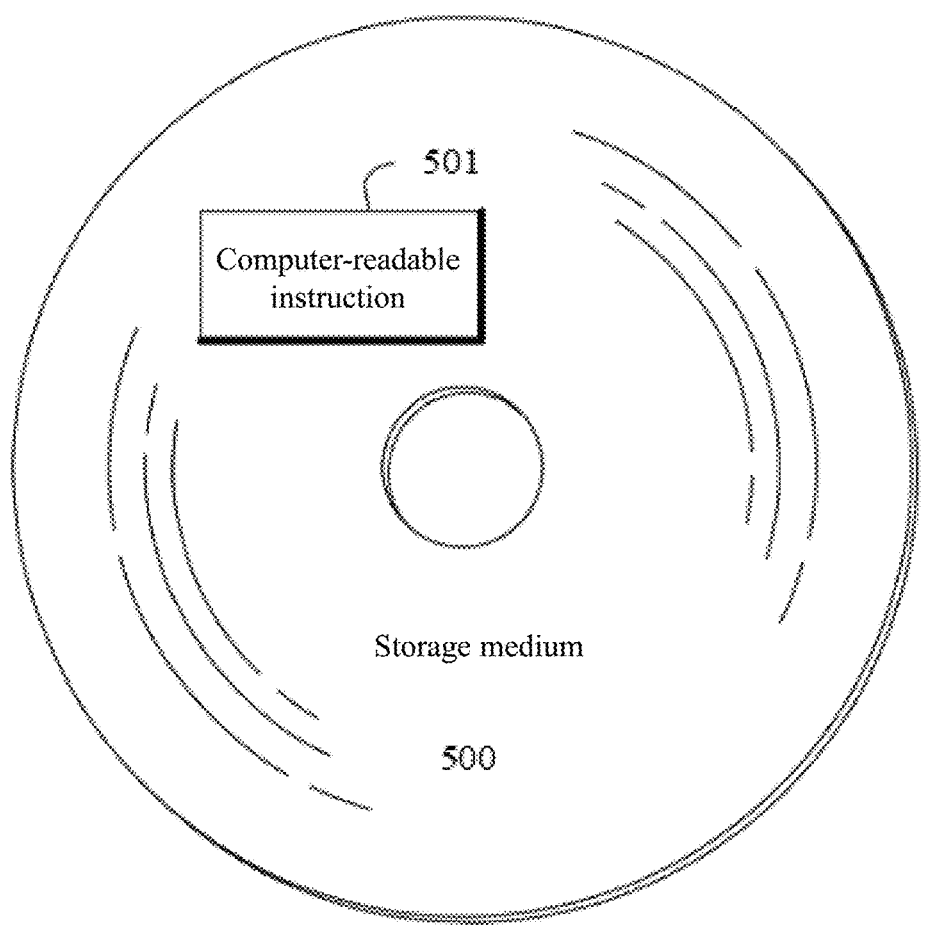
FIG. 4 is a schematic diagram of a storage medium according to at least one embodiment of the disclosure.

At least one embodiment of the disclosure further provides a storage medium, and FIG. 4 is a schematic diagram of a storage medium according to at least one embodiment of the disclosure. For instance, as shown in FIG. 4, one or more computer-readable instructions 501 may be non-transitory stored on a storage medium 500. For instance, when the computer-readable instruction 501 is executed by a computer, one or more steps in the handwritten content removing method described above may be executed.

For instance, the storage medium 500 may be applied in the handwritten content removing device 300, for example, the storage medium 500 may include the memory 301 in the handwritten content removing device 300.

For instance, for the description of the storage medium 500, reference may be made to the description of the memory in the embodiments of the handwritten content removing device 300, and repeated description is thus not repeated herein.

Figure 5:
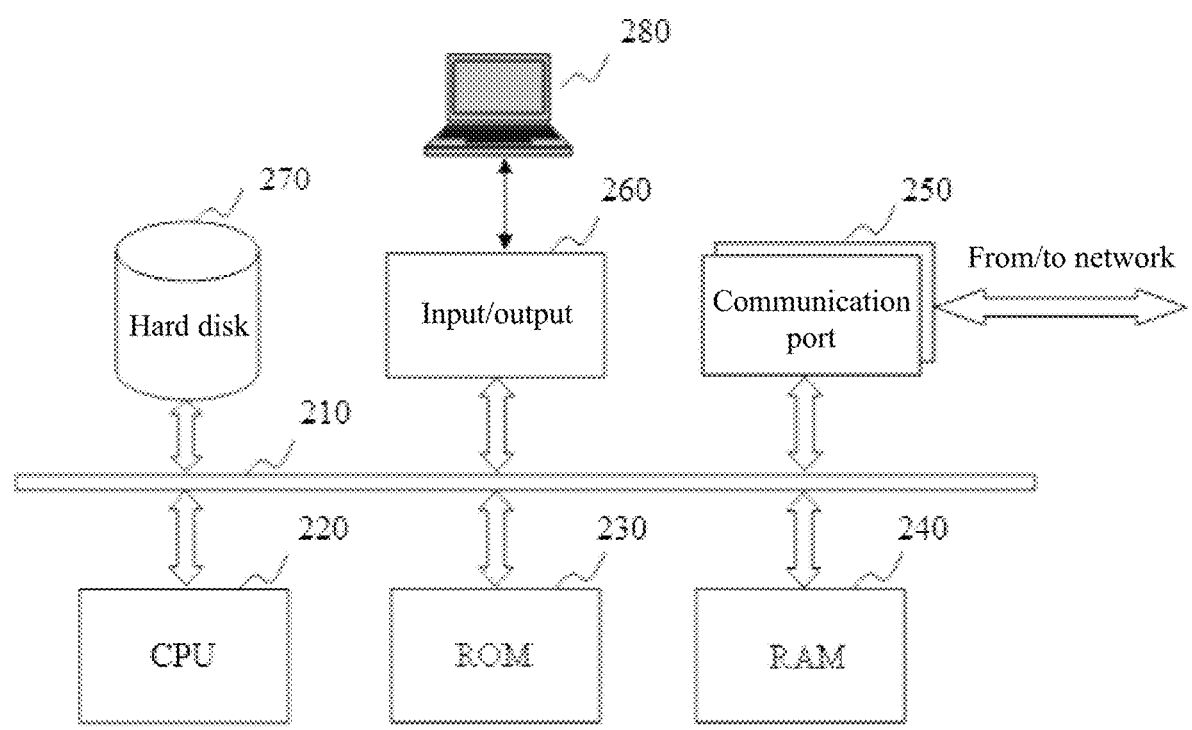
FIG. 5 is a schematic diagram of a hardware environment according to at least one embodiment of the disclosure.

FIG. 5 is a schematic diagram of a hardware environment according to at least one embodiment of the disclosure. The handwritten content removing device provided by the embodiments of the disclosure may be applied to the Internet system.

The computer system provided in FIG. 5 may be used to implement the handwritten content removing device involved in the disclosure. Such a computer system may include a personal computer, a notebook computer, a tablet computer, a mobile phone, and any smart portable apparatus. In this embodiment, a hardware platform including a user interface in the specific system is explained through a functional block diagram. This kind of computer system may include a general-purpose computer apparatus or a special-purpose computer apparatus. Both of these computer apparatuses may be used to implement the handwritten content removing device in this embodiment. The computer system may implement any of the currently described components that implement the information required for the handwritten content removing method. For example, a computer system may be realized by a computer apparatus through its hardware device, software program, firmware, and a combination thereof. For convenience, only one computer apparatus is depicted in FIG. 5. However, the computer functions related to the information required to implement the handwritten content removing method described in this embodiment may be implemented by a group of similar platforms in a distributed manner to disperse the processing load of the computer system.

As shown in FIG. 5, the computer system may include a communication port 250 to which is connected a network enabling data communication, for example, the communication port 250 may communicate with the image acquisition component 403 as described above. The computer system may also include a processor group 220 (that is, the processor described above) for executing program instructions. The processor group 220 may be formed by at least one processor (e.g., a CPU). The computer system may include an internal communication bus 210. The computer system may include different forms of program storage units and data storage units (i.e., the memory or storage medium described above), such as a hard disk 270, a read only memory (ROM) 230, and a random access memory (RAM) 240, and may include various data files that can be used to store computer processing and/or communication as well as possible program instructions executed by the processor group 220. The computer system may further include an input/output component 260, and the input/output component 260 may support the input/output data flow between the computer system and other components (e.g., a user interface 280, which may be the display described above). The computer system may also send and receive information and data through the communication port 250.

In some embodiments, the computer system described above may be used to constitute a server in an Internet communication system. The server of the Internet communication system may be a server hardware device or a server group. Each server within a server group may be connected through a wired or wireless network. A server group may be centralized, such as a data center. A server group may be distributed, such as a distributed system.

It should also be noted that in the disclosure, each block in the block views and/or flow charts and the combination of the blocks in the block views and/or flow charts may be implemented by a dedicated hardware-based system that performs specified functions or actions, or may be implemented by a combination of dedicated hardware and computer program instructions. It is well known to a person having ordinary skill in the art that implementation in hardware, implementation in software, and implementation in a combination of software and hardware are all equivalent.

Regarding the disclosure, the following is required to be explained.

(1) The accompanying drawings of the embodiments of the disclosure only refer to the structures related to the embodiments of the disclosure, and general design may be referenced for other structures.

(2) For clarity, in the accompanying drawings used to describe the embodiments of the disclosure, the thickness and size of layers or structures are exaggerated. It should be understood that when an element such as a layer, film, region, or substrate is referred to as being "on" or "under" another element, the element may be "directly" "on" or "under" the another element, or intervening elements may be presented therebetween.

(3) The embodiments of the disclosure and the features in the embodiments may be combined with each other to obtain new embodiments with absence of conflict.

The above are only specific implementation of the disclosure, but the protection scope of the disclosure is not limited thereto. The protection scope of the disclosure should be subject to the protection scope of the claims.

What is claimed is:

1. A handwritten content removing method, comprising:
   acquiring an input image of a text page to be processed, wherein the input image comprises a text printed region and a handwritten region, the text printed region comprises printed content and the handwritten region comprises handwritten content;
   using a region identification model to identify the input image to obtain the text printed region and the handwritten region and determine the handwritten content in the handwritten region; and
   removing the handwritten content in the input image to obtain an output image.

2. The handwritten content removing method according to claim 1, wherein the step of removing the handwritten content in the input image to obtain the output image comprises:
   labeling the handwritten region to obtain a handwritten region labeling frame, wherein the handwritten region labeling frame comprises the handwritten region; and
   cutting and removing the handwritten region labeling frame from the input image to obtain the output image.

3. The handwritten content removing method according to claim 2, wherein the step of cutting and removing the handwritten region labeling frame from the input image to obtain the output image comprises:
   cutting and removing the handwritten region labeling frame from the input image to obtain an intermediate output image; and
   performing a binarization process on the intermediate output image to obtain the output image.

4. The handwritten content removing method according to claim 1, wherein
   after using the region identification model to identify the input image to obtain the text printed region and the handwritten region, further comprising:
   using a pixel identification model to perform pixel identification on the handwritten region to determine handwritten content pixels corresponding to the handwritten content in the handwritten region.

5. The handwritten content removing method according to claim 4, wherein the step of removing the handwritten content in the input image to obtain the output image comprises:
   acquiring a replacement pixel value; and
   replacing pixel values of the handwritten content pixels with the replacement pixel value, so as to remove the handwritten content from the input image to obtain the output image.

6. The handwritten content removing method according to claim 5, wherein the step of replacing the pixel values of the handwritten content pixels with the replacement pixel value so as to remove the handwritten content from the input image to obtain the output image comprises:
   replacing the pixel values of the handwritten content pixels with the replacement pixel value, so as to remove the handwritten content from the input image to obtain an intermediate output image; and
   performing a binarization process on the intermediate output image to obtain the output image.

7. The handwritten content removing method according to claim 5, wherein the replacement pixel value is the pixel value of any pixel in the handwritten region except for the handwritten content pixels; or
   the replacement pixel value is an average value of pixel values of all pixels in the handwritten region except for the handwritten content pixels.

8. The handwritten content removing method according to claim 1, wherein the text page to be processed is an exam paper or a worksheet, the printed content comprises a question stem, and the handwritten content comprises an answer.

9. The handwritten content removing method according to claim 1, wherein the handwritten content comprises handwritten characters.

10. The handwritten content removing method according to claim 1, wherein the step of acquiring the input image of the text page to be processed comprises:
    acquiring an original image of the text page to be processed, wherein the original image comprises a text region to be processed,
    performing edge detection on the original image to determine the text region to be processed in the original image; and
    performing a correction process on the text region to be processed to obtain the input image.

11. A handwritten content removing device, characterized by comprising:
    a memory, configured for non-transitory storage of a computer-readable instruction; and
    a processor, configured for executing the computer-readable instruction, wherein the computer-readable instruction executes the handwritten content removing method according to claim 1 when being executed by the processor.

12. The handwritten content removing device according to claim 11, wherein further comprising an image acquisition component,
wherein the image acquisition component is configured for acquiring a homework image, the memory is configured for storing the homework image, and the processor is further configured for reading and processing the homework image to obtain the input image.

13. A storage medium, configured for non-transitory storage of a computer-readable instruction, wherein the computer-readable instruction executes the handwritten content removing method according to claim 1 when being executed by a computer.

* * * * *